July 23, 1968 G. L. MAYO ETAL 3,393,812
LUMBER STACKING MACHINE
Filed Oct. 23, 1965 4 Sheets-Sheet 1
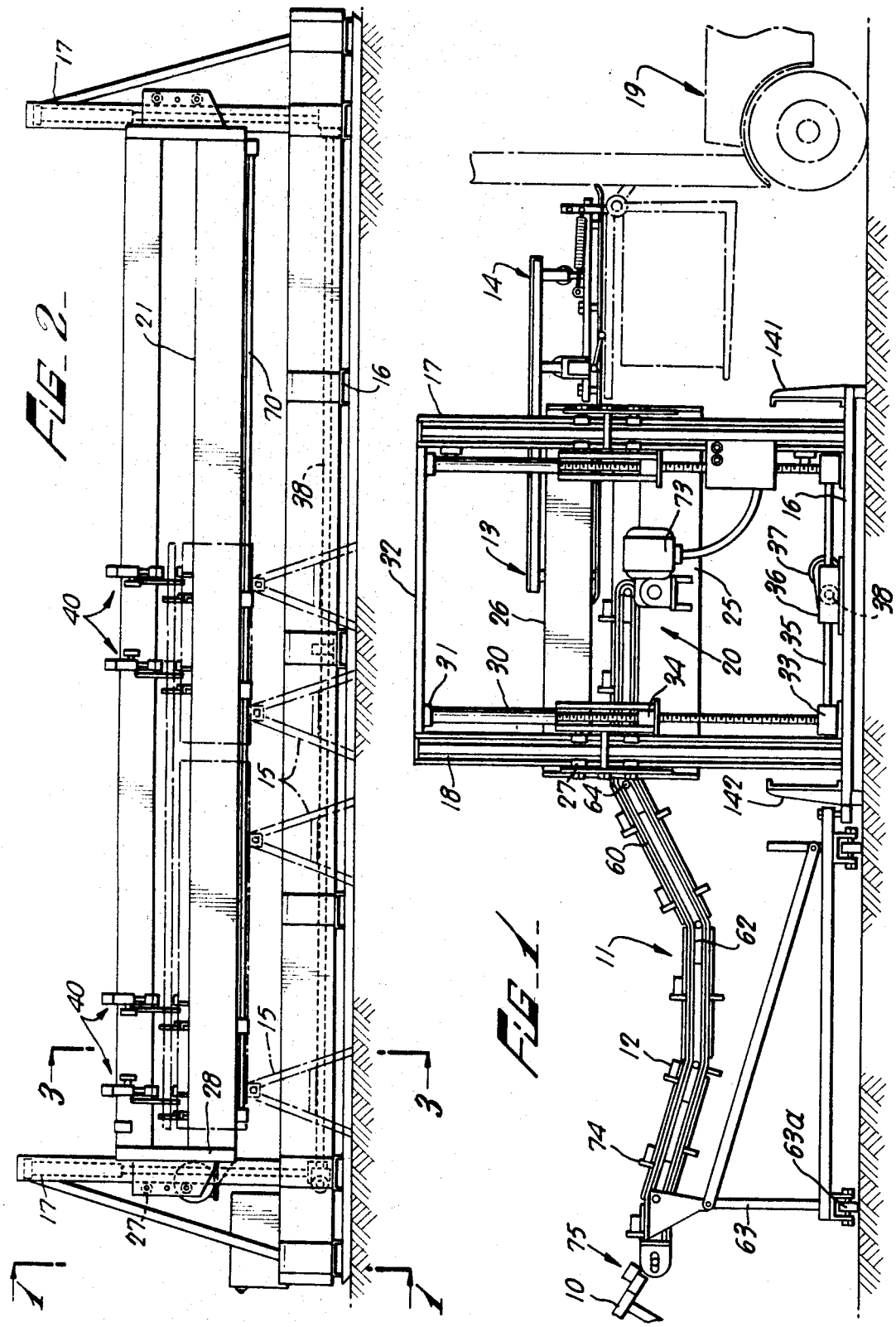

Fig. 3

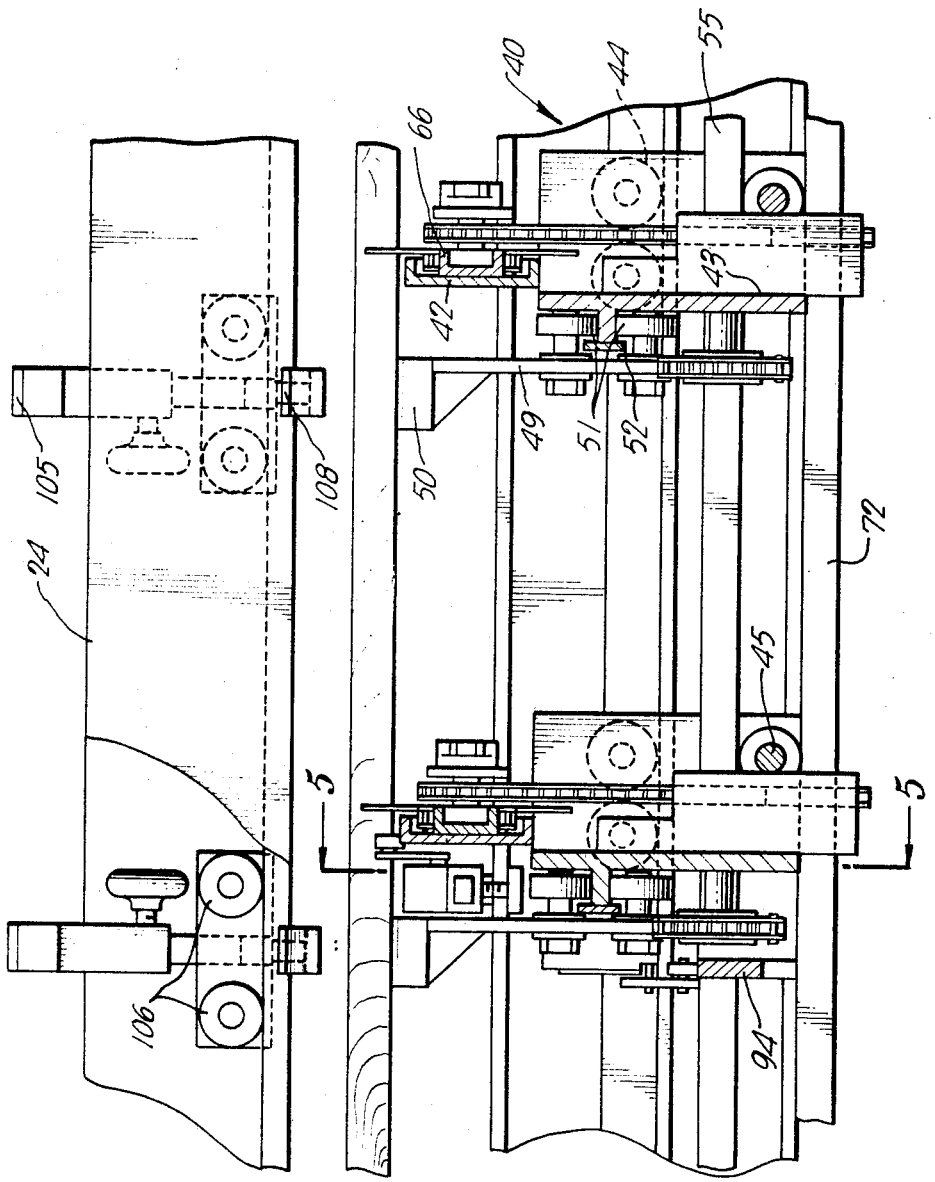

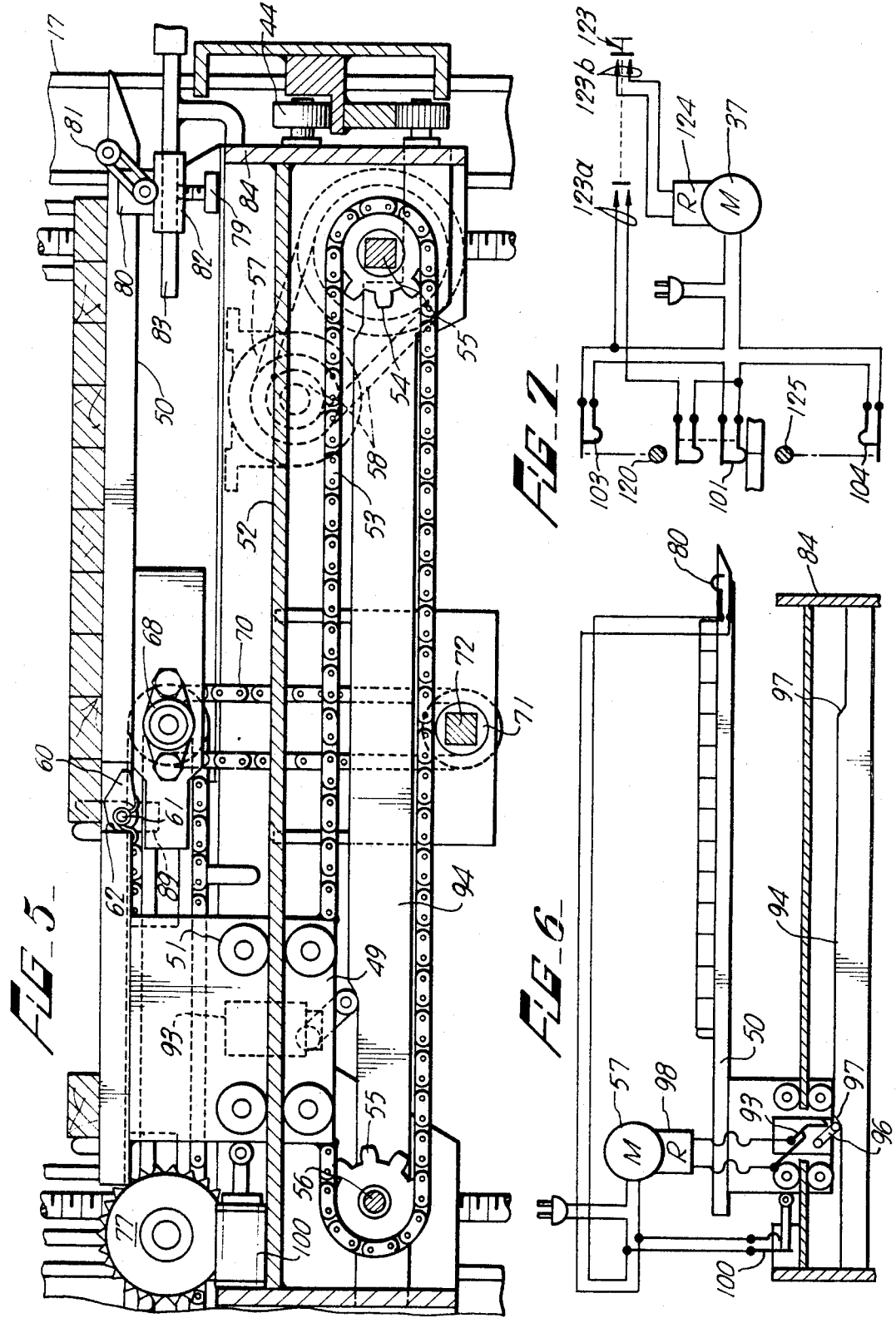

United States Patent Office

3,393,812
Patented July 23, 1968

1

3,393,812
LUMBER STACKING MACHINE
George L. Mayo, Fort Worth, and Djavad G. Ghazisaid, Arlington, Tex., assignors to Clary Corporation, San Gabriel, Calif., a corporation of California
Filed Oct. 23, 1965, Ser. No. 503,699
8 Claims. (Cl. 214—6)

ABSTRACT OF THE DISCLOSURE

A lumber stacking machine comprising a vertically movable carriage having a board receiving side and an opposite board delivery side, board carrying forks carried by the carriage, the forks moving from inboard to outboard positions to locate boards accumulated thereon over a truck or the like, means for stripping the boards during return of the forks from their offboard positions, and means controlled by stripped ones of the boards for raising the carriage.

---

This invention relates to apparatus for handling lumber and has particular reference to apparatus for stacking boards or the like for either drying, storage or transportation.

Stacking machines of the above nature have been proposed and used for quite some time and most such machines perform fairly satisfactorily. However, in most cases, special receiving elevators, trucks or the like are located at the delivery end of the machine for receiving successive courses of boards to form a stack. For example, in many cases, an elevator type receiver is provided at the delivery end which is lowered as successive courses are received. In other cases, the receiving means is tilted to allow successive courses of boards to be slid into place.

Although such special receiving means theoretically facilitate loading, they reduce flexibility of operation since it may be desirable at different times to load the lumber onto different types of receivers such as trucks, stationary supports, fork lifts, railroad cars or the like.

Also, it has been found that in the use of an inclined receiving means wherein successive courses of boards are slid by gravity over previously laid courses, problems are encountered because of warped, uneven boards which may cause boards of succeeding courses to catch or roll.

It therefore becomes a principal object of the present invention to provide a stacking machine for lumber or the like in which lumber to be stacked may be delivered to any type of receiving means.

Another object is to provide a stacking machine for lumber or the like of widely varying lengths.

Another object is to provide a stacking machine of the above type which does not require boards or the like to be slid over one another in order to effect stacking.

Another object is to provide a stacking machine of the above type which may stack boards of different thicknesses without need of adjustment.

Another object is to provide a stacking machine of the above type which may be readily set to accumulate stacks of different heights and/or widths.

Another object is to provide a stacking machine for lumber or the like which is relatively fast and highly reliable.

The manner in which the above and other objects of the invention are accomplished will be readily understood on reference to the following specification when read in conjunction with the accompanying drawings, wherein:

FIG. 1 is an end view of a stacking machine employing a preferred form of the present invention and is taken along the line 1—1 of FIG. 2.

FIG. 2 is a side view of the stacking machine.

FIG. 3 is a transverse sectional view taken substantially along the line 3—3 of FIG. 2.

FIG. 4 is a sectional view through two of the stacking units and is taken substantially along the line 4—4 of FIG. 3.

FIG. 5 is an enlarged sectional view similar to that of FIG. 3, illustrating the gathering station.

FIG. 6 is a schematic view illustrating the circuitry for controlling the stacking forks.

FIG. 7 is a schematic view illustrating the circuitry for controlling the elevator motor.

Referring in general to FIG. 1, the stacking machine, when viewed from the end, comprises a conveying station 11 for moving lumber in the form of boards 12 laterally from a suitable processing apparatus or other source, partly shown at 10, to a central combined elevator and gathering station generally indicated at 13. When a course or layer of boards is accumulated at the gathering station it is moved laterally to a stacking station generally indicated at 14 where the course is deposited upon a previous course or stack which is supported by any suitable type of receiving means. For example, in FIG. 1, there is shown a fork lift machine indicated by the dot-dash lines 19 located in a position facing the stacking machine. However, the boards could be equally well stacked on stationary supports such as shown by the dot-dash lines 15 in FIG. 2. Also, the boards could be stacked on carts or trucks located in positions alongside or facing the machine, depending upon the lengths of the boards or other factors.

The central station 13 comprises a base frame including longitudinally extending side channel members 141 and 142 held in spaced relation by cross frame members 16. Upright posts 17 and 18 are located at each end of the frame and are rigidly secured thereto.

Figure 3:
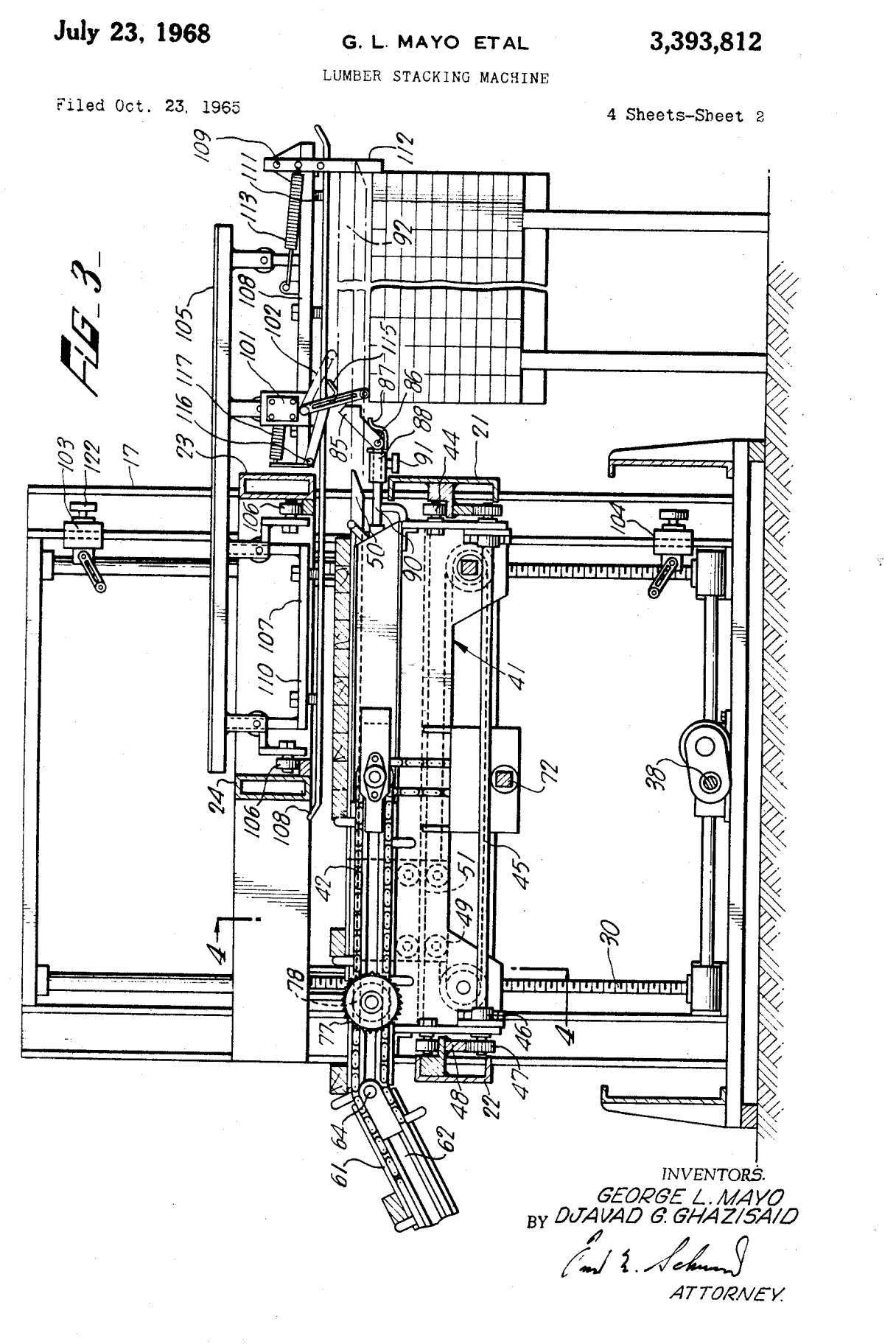

An elevator carriage 20 is mounted for parallel vertical movement along the various posts 17 and 18. The carriage comprises two lower side frame members 21 and 22 (FIG. 3) and two upper side frame members 23 and 24, held in spaced relation by cross frame members 25 and 26, respectively, at opposite ends of the carriage. Rollers 27 are carried by headers 28 secured to the elevator carriage to guide the latter vertically along the posts.

Means are provided for raising and lowering the carriage 20 and for this purpose screw threaded rods 30 are located directly adjacent each of the posts. Each rod 30 is rotatably mounted at its upper end in a bearing 31 carried by a cross frame 32 secured between posts 17 and 18. The lower ends of the rods are rotatably mounted in combined bearings and transmission units 33 supported by the cross braces 16. The rods 30 are threaded in nuts 34 carried by the carriage and are rotated by cross shafts 35 which, in turn, are driven through transmission units 36 by a motor 37 through a longitudinally extending drive shaft 38.

A plurality of stacking units, generally indicated at 40 (FIG. 2), are provided on the elevator carriage 20 for gathering and stacking successive courses of boards. Although four such stacking units are shown, this number may be increased or decreased, depending on the lengths of the boards being handled or the number of stacks which is desired to concurrently accumulate.

Describing now the construction of the stacking units, since all are similar, only one will be described in detail. As shown in FIGS. 3, 4 and 5, each stacking unit comprises a cross carriage 41 including a channel member 42 and a frame member 43 suitably secured together and supported by rollers 44 for movement along the side frame members 21 and 22 of the elevator carriage for adjustment into different positions. A shaft 45 is journalled in bearings 46 carried by the carriage 41 and has pinions 47 secured to opposite ends thereof which mesh with gear racks 48 on the frame members 21 and 22 to insure parallel movement of the carriage 41. Suitable means, not shown, is provided to lock the carriage in different adjusted positions.

A horizontally extending stacking fork 50 is mounted on the carriage 41 for movement between its full and dot-dash line positions shown in FIG. 3. For this purpose the fork has a plate member 49 integral therewith and carrying rollers 51 which are guided over a ledge 52 extending from the carriage frame member 43.

For the purpose of reciprocating the fork 50, a chain 53 is attached at opposite ends to the plate member 49 and is fed over spaced sprockets 54 and 55. The sprocket 54 is splined on a square drive shaft 55 which extends along the length of the machine and is similarly splined to corresponding sprockets carried by other stacking units 40. Suitable means, not shown, constrains the sprocket 54 to move with the carriage 41 during adjustment of the latter while sprocket 55 is supported on a stud 56 extending from the frame member 43.

A reversible motor 57 is mounted on one of the frame members of the elevator carriage 20 and is entrained with the shaft 55 through a chain and sprocket arrangement 58.

The fork 50 has its upper surface located slightly above the surface of the channel member 42 and is adapted to accumulate a course of boards thereon, as shown in FIGS. 3 and 5, as they are received from the conveyor station 11.

For the purpose of positively advancing an accumulated course of boards to the stacking station, a feed dog 60 is pivotally supported at 61 on each fork and is urged counterclockwise toward its dotted line position shown in FIG. 5 by a torsion spring 62. As boards are fed onto the forks, the dogs 60 will be deflected downwardly into their full line positions against the action of the springs.

Describing now the conveyor means for feeding the boards onto the stacking forks regardless of the height to which the elevated carriage is moved, each stacking unit 40 has associated therewith an endless conveyor chain 160. The chain is guided in grooves 61 formed in a plurality of pivotally connected chain guide links 62. The foremost link is supported by a framework 63 carried by wheels 63a and the rearmost link is pivotally connected at 64 to the channel member 42 of the carriage 41. A channel member 66 attached to member 42 forms a guide for guiding the chain onto a drive sprocket 68. The latter is rotatably supported by the member 42 and is connected to a similar sprocket driven by an endless chain 70 which passes over a sprocket 71 splined to a square drive shaft 72. This shaft extends the length of the machine to drive corresponding sprockets associated with the other stacking units and is continuously driven by a motor 73, FIG. 1, mounted on the carriage 20.

The chain 160 carries a series of spaced feed lugs 74 which pick up the boards from a delivery point 75 and advance the same onto the stacking forks 50 and past the feed dogs 60.

Since the upper surfaces of the forks are higher than the upper surfaces of the channel members 42, means are provided to raise the boards slightly as they pass onto the forks. For this purpose, a toothed wheel 77 is rotatably supported by each channel member 42 and is provided with a sprocket 78 meshing with the chain 160. As the boards engage the toothed wheels, they are raised sufficiently to ride over the upper surfaces of the forks when the latter are in their normal positions shown in full lines in FIG. 3.

Means are provided to energize the motor 57 (FIGS. 5 and 6) to reciprocate the forks 50 only when a full course of boards is accumulated on the forks. For this purpose, an electric switch 80 (FIGS. 3 and 5) having an actuating arm 81 located in the path of the boards, is provided. The switch is adjustably mounted on one of the carriages 41 and for this purpose is mounted on a sleeve 82 adjustable along a rod 83 carried by a plate 84 integrally secured to the members 42 and 43 forming carriage 41. The sleeve may be locked in any adjusted position by a lock bolt 79.

As a course of boards is accumulated on the forks 50 and as the last board of the course is fed to the right of its position shown in FIG. 5 by a feed lug 74, over the dog 60, the first board of the course engages the arm 81, causing the switch 80 to complete the motor circuit. Accordingly, the forks 50 are advanced to the right in FIGS. 1, 3 and 5 to locate the course over previous courses stacked on a suitable receiver as described heretofore. As the forks leave their normal positions, a normally closed switch 100 closes to maintain the motor circuit closed.

As the forks 50 advance, the boards ride over a stripper pawl 85 pivotally supported at 86 and urged upwardly by a spring 87. The pivotal support 86 is carried by sleeve 88 adjustable along a rod 90 carried by carriage 41 and may be locked in different positions by a lock bolt 91.

When the course of boards has been fully advanced, as indicated by the dot and dash lines 92, into the stacking or delivery station, the pawl 85 is raised to a position behind the last board of the course so that during the return of the forks the boards will be stripped off and fall into position upon the last course of the stack.

A depending lug 89 is carried by each of the stacking forks 50 with its righthand edge approximately aligned with the righthand edge of the associated feed dog 60 when the latter is in elevated position. Accordingly, if the forks should happen to drag one or more underlying boards to the left during retraction, the lug 89 will return it or them during the subsequent excursion of the forks.

Means are provided for reversing the direction of drive of the motor 57 as the forks reach the opposite extremes of their travel and for this purpose a switch 93 is carried on the fork plate 49 and is controlled by the upper surface of a control bar 94 supported by the plate 84 at one end and by a similar plate at the other end, both plates being carried by the carriage 41. As the forks reach either end of their travels, a follower lever 96, forming part of the switch 93, rides down an inclined edge 97 on the bar 94, closing the switch 93 and completing a circuit to a reversing unit 98 to thereby throw a reversing switch, not shown, in the circuit of motor 57.

As the fork 50 returns to its normal position shown in FIGS. 3 and 5, and after the reversing switch is reversed, it opens the normally closed switch 100 in the circuit of motor 57 to thereby arrest movement of the forks. The latter will therefore remain stationary until the next course of boards has accumulated, whereupon the switch 80 will again be closed to energize the motor 57, thereby advancing the forks 50 sufficiently to re-close the switch 100 so that the motor 57 will remain energized until the forks have made a complete new excursion.

Means are provided for energizing the elevator motor 37 during the process of stripping the course of boards onto an underlying course. For this purpose, a two-pole switch 101 (see also FIG. 7) is carried by carriage 41, as will be described presently, and is provided with an actuator arm 102 engageable with the boards. As the course carried by the stacking forks 50 is advanced to the right, the leading board will engage the arm 102, thus closing the switch and completing a circuit through normally closed upper and lower limit switches 103 and 104, respectively, to the motor 37, thereby energizing the latter to raise the elevator carriage. This will occur during the stripping operation and until the carriage has raised an amount substantially equal to the thickness of the boards being stripped.

Adjustable guide means are provided for preventing dislodgement of the boards of a course being advanced to the delivery station and for supporting the switch 101. Such guide means comprises a support member 105 carried by rollers 106 which are movable along ledges on the frame members 23 and 24. Suitable means, not shown, are provided for clamping the support members in different positions to which the stacking units 40 are adjusted.

The support member 105 has mounted thereon a U-shaped member 107 which supports the lefthand portion of a skid member 108 through flexible springs 110. The member 107 is adjustable vertically in accordance with the thickness of the boards being stacked. The member 105 similarly supports a member 108 which, in turn, supports the righthand portion of the skid member 108 through yieldable springs 111.

A stop member 112 is pivotally supported at 109 on the member 108 and is urged clockwise to its position shown by a tension spring 113, thereby preventing rolling or dislodgement of the righthand board in the uppermost course as it is being laid.

Similarly, a hold-down lever 115 is pivotally supported at 116 on the member 108 and is urged clockwise by a tension spring 117 to press the last board being stripped downwardly onto the preceding course.

Means are provided to limit the upward movement of the elevator carriage 20 and thus limit the height of a stack of lumber being laid. For this purpose, a projection 120 (FIG. 7) on the carriage is engageable with the switch 103 to open the same and thus open the circuit to the motor 37. It will be noted in FIG. 3 that the switch may be clamped in different positions along the post 17 by a clamp screw 122 to thereby automatically arrest the machine when a desired stack height has been reached.

In order to lower the elevator carriage when a complete stack has been accumulated and the limit switch 103 has been opened, a double pole switch 123 is manually closed. The latter has one pole 123a connected across the aforementioned switches 101 and 103 so as to complete the motor circuit even though one or both of the latter switches are open. The other pole 123b of the switch is connected to a reversing switch mechanism 124 associated with the motor 37 whereby to cause reverse operation of the motor to lower the carriage.

When the carriage reaches its lowermost limit of travel, a projection 125 thereon opens the lower limit switch 104 to arrest the carriage travel.

It will be noted on reference to FIG. 2 that the stacking units 40 can be spaced to concurrently stack two or more stacks of boards or they can be spaced to stack a single stack of extremely long boards.

Although the invention has been described in detail and certain specific terms and languages have been used, it is to be understood that the present disclosure is illustrative rather than restrictive and that changes and modifications may be made without departing from the spirit or scope of the invention as set forth in the claims appended hereto.

Having thus described the invention, what is desired to be secured by United States Letters Patent is:

1. In a lumber stacking machine,
the combination of a carriage having a board receiving side and an opposite board delivery side,
means guiding said carriage for parallel vertical movement,
horizontal board guide means on said carriage,
horizontal board carrying forks,
means for delivering boards over said guide means and said forks adjacent said receiving side,
means on said carriage supporting said forks for movement from inboard positions aligned with said guide means to positions at least partly offboard of said delivery side,
feed elements carried by said forks for moving superimposed ones of said boards along with said forks during movement of said forks from said inboard positions to said outboard positions only,
means for reciprocating said forks between said positions,
stripper means for stripping said boards from said forks during movement of said forks from said offboard positions to said inboard positions, and
means controlled by stripped ones of said boards for raising said carriage.

2. The combination according to claim 1 wherein said reciprocating means comprises an electric motor for moving said forks between said inboard and offboard positions thereof,
a circuit for said motor, and
a control member for said circuit controlled by one of a plurality of boards accumulated on said forks while in said inboard positions.

3. The combination according to claim 1 comprising a motor for moving said forks between said inboard and offboard positions thereof,
a circuit for said motor,
a control member for said circuit actuated by one of a plurality of boards accumulated on said forks while in said inboard positions, and
means for setting said control member in different positions relative to said delivery side whereby to vary the width of an accumulated stack of said boards.

4. The combination according to claim 1 comprising a motor for moving said forks between said inboard and offboard positions thereof,
a circuit for said motor including means for reversing said motor;
a control member for said circuit controlled by one of a plurality of boards accumulated on said forks while in said inboard positions,
means for selectively locating said control member in different positions relative to the offboard positions of said forks, and
means responsive to movement of said forks to said inboard and offboard positions for operating said reversing means.

5. The combination according to claim 1 comprising means on said carriage supporting said board guide means and said forks for movement to different positions transversely of said receiving and delivery sides.

6. In a lumber stacking machine.
the combination of a carriage having a board receiving side and an opposite board delivery side,
means guiding said carriage for parallel vertical movement,
means for moving said carriage to different vertical positions,
horizontal guide rails on said carriage,
horizontal board carrying forks,
the upper surfaces of said forks being located at substantially the same height as the upper surfaces of said rails,
conveyor means for delivering boards over said rails and said forks,
means on said carriage supporting said forks for movement from inboard positions aligned with said rails to positions at least partially offboard of said delivery side,
feed dogs carried by said forks,
said feed dogs being yieldable during movement of said forks from said offboard positions to said inboard positions, and
stripper dogs carried by said carriage for stripping boards from said forks during movement of said forks from said offboard positions to said inboard positions,
said stripper dogs being yieldable during movement of said forks in the opposite direction.

7. In a lumber stacking machine,
the combination of a carriage having a board receiving side and an opposite board delivery side,
means guiding said carriage for parallel vertical movement,
means for raising and lowering said carriage,
horizontal board carrying forks, conveyor means for delivering boards onto said forks, means on said carriage supporting said forks for movement from inboard positions to positions at least partially offboard of said delivery side, means responsive to accumulation of a course of boards on said forks for moving said forks to said offboard positions and for thereafter returning said forks to said inboard positions, and stripper dogs carried by said carriage for stripping boards from said forks during movement of said forks from said offboard positions to said inboard positions, said stripper dogs being ineffective during movement of said forks in the opposite direction.

8. The combination according to claim 7 comprising means controlled by a stripped one of said boards for raising said carriage by an amount substantially equal to the thickness of a said course.

References Cited

UNITED STATES PATENTS

| | | | |
|---|---|---|---|
| 1,129,214 | 2/1915 | McIlvried | 214—6 |
| 1,202,838 | 10/1916 | Heffernan | 214—6 |
| 2,397,720 | 4/1946 | Beane | 214—6 |
| 2,607,501 | 8/1952 | Jeffrey | 214—6 |
| 2,658,630 | 11/1953 | Melin | 214—6 |
| 2,686,603 | 8/1954 | Lawson | 214—6 |
| 2,861,702 | 11/1958 | Mason | 214—6 |
| 2,895,624 | 7/1959 | Oster | 214—6 |
| 2,977,002 | 3/1961 | Asp | 214—6 |
| 3,169,646 | 2/1965 | Mason | 214—6 |

FOREIGN PATENTS

| | | |
|---|---|---|
| 570,047 | 2/1933 | Germany. |
| 141,624 | 8/1953 | Sweden. |

ALBERT J. MAKAY, *Primary Examiner.*